United States Patent [19]

Plate et al.

[11] E Re. 30,776

[45] Reissued Oct. 20, 1981

[54] BREAK-OUT APPARATUS FOR FAULT PREVENTION IN THE PRODUCTION OF MULTI-STRAND YARNS

[75] Inventors: Dieter E. A. Plate, Torquay; John D. Feehan, Belmont, both of Australia

[73] Assignee: Commonwealth Scientific and Industrial Research Organization, Campbell, Australia

[21] Appl. No.: 147,016

[22] Filed: May 6, 1980

Related U.S. Patent Documents

Reissue of:

[64] Patent No.: 4,110,963
Issued: Sep. 5, 1978
Appl. No.: 796,790
Filed: May 13, 1977

[30] Foreign Application Priority Data

May 13, 1976 [AU] Australia ..... 5921/76

[51] Int. Cl.[3] ..... D01H 13/16

[52] U.S. Cl. ..... 57/86; 57/264; 57/352

[58] Field of Search ..... 57/13, 14, 19, 78, 80, 57/85, 86, 87, 352, 264

[56] References Cited

U.S. PATENT DOCUMENTS

| | | | |
|---|---|---|---|
| 976,499 | 11/1910 | Saracco | 57/86 |
| 1,537,532 | 5/1925 | Hartman et al. | 57/86 |
| 1,995,730 | 3/1935 | Abbott | 57/86 X |
| 2,494,490 | 1/1950 | Rinehart et al. | 57/86 |
| 2,528,297 | 10/1950 | Boyd | 57/86 |
| 2,528,298 | 10/1950 | Boyd | 57/86 |
| 3,389,545 | 6/1968 | Grunder et al. | 57/352 X |
| 3,759,026 | 9/1973 | Hope | 57/86 X |
| 3,924,297 | 12/1975 | Ingham | 57/86 X |

FOREIGN PATENT DOCUMENTS 952790 3/1964 United Kingdom .

*Primary Examiner*—Donald Watkins
*Attorney, Agent, or Firm*—Sughrue, Mion, Zinn, Macpeak and Seas

[57] ABSTRACT

Apparatus and processes for breaking out a residual strand where one strand breaks in a strand combining operation. The invention makes use of the change in the line of travel of the residual strand to effect break out in the new line of travel.

10 Claims, 11 Drawing Figures

BREAK-OUT APPARATUS FOR FAULT PREVENTION IN THE PRODUCTION OF MULTI-STRAND YARNS

Matter enclosed in heavy brackets [ ] appears in the original patent but forms no part of this reissue specification; matter printed in italics indicates the additions made by reissue.

This invention relates generally to the production of yarns having two or more strands combined together. Examples of processes resulting in such yarns, and of apparatus for carrying out the processes, are to be found in applicants Australian Pat. Nos. 438,072 and 473,153, in United Kingdom Pat. Nos. 1,062,594, 1,256,528 and 1,263,285 and in U.S. Pat. Nos. 3,019,593 and 3,113,413. In the yarns described in these papers the strands are combined by being twisted together; there may be twist in the individual strands in addition to the ply twist, as in the yarn described in each of the two Australian patents, or there may be no twist in the strands, only ply twist.

The invention has particular utility where processes of the kind in question are carried out on a spinning frame typically having two hundred or more units at which a pair or more of strands are separately fed from a common or respective drafting section and converged to form a unitary yarn which is fed onto a suitable take-up spindle.

Occasionally during the operation of such spinning frames, one strand of a converging group of strands will break and the residual strands will continue to feed as a fault yarn onto the take-up spindle. By the time the fault, for example, a singles yarn, is detected by the operator, or by the time the residual strand also breaks, a quite considerable length of singles yarn will usually have been produced: where the output yarn of the frame is passed as a batch for weaving or the like, a quite serious fault might well be introduced into the end material.

In accordance with the invention, this problem is met by providing for the unbroken strand or strands to be likewise broken without delay so that any particular unit at which a break fault develops will promptly cease production rather than produce an unsatisfactory output. To achieve this end, the invention takes advantage of the alteration of the path of travel of the residual strand or strands which will arise from loss of one running strand from the combined bundle.

The invention provides, in one aspect, apparatus for breaking out yarns having fewer strands than desired where two or more strands are combined into a yarn, said apparatus comprising a guide for constraining the combined strands laterally of their general direction of travel, the guide being mounted for lateral movement under pressure from a residual strand in the absence of the other to allow the residual strand to adopt a respective modified line of travel, and strand breaker means arranged to act on a strand adopting a said modified line of travel to effect breakout of that strand.

The precise nature of the strand breaker means will depend very much on the particular yarn production process under consideration. In general, it may simply comprise an abrasive face, cutting edge or shearing nip with which the laterally moving residual strand comes into contact. In the case of the process and apparatus described in the aforementioned Australian Pat. No. 473,153 as applied to fibrous strands, use may be made of the twist blocking rollers to the extent that the lengthwise extent of the relieved circumferential portion of one of the rollers may be kept within prescribed limits so that yarn production may continue properly while the strands remain intact, but so that, on breakage of one strand, the residual strand is allowed to move laterally until it crosses the edge of the relieved portion and is nipped between the twist blocking rollers to indefinitely prevent twist extending to the region of the strand lying between the twist blocking rollers and the point at which the strand is fed from the drafting mechanism. Within this region, there will be a rapid decay in the twist level in the strand as the latter continues to be fed to the take-up spindle until the fibres comprising the strand separate and the strand thereby breaks up.

The aforesaid guide, which may be a convergence guide, may be mounted for said lateral movement by being supported for pivotal movement in a plane transverse to the general direction of travel of the combined strands. In practice, it is found that even with both strands intact, a random jitter of the guide may occur due, for example, to variations in strand tension or fibre density. However, it is believed that the guide may be constrained by damping means of a magnitude which is sufficient to substantially reduce such random movement but insufficient to prevent the guide from responding as prescribed to a break in one of the strands being converged.

The invention also provides a method of breaking out yarns having fewer strands than desired where two travelling strands are fed from spaced feeding points and combined into a single yarn, comprising allowing the residual strand to adopt a respective modified line of travel when one of the strands breaks out and acting on the residual strand in its said modified line of travel to also effect breakout of that strand.

The invention will now be described by way of example only with reference to the accompanying drawings, in which.

Figure 1:
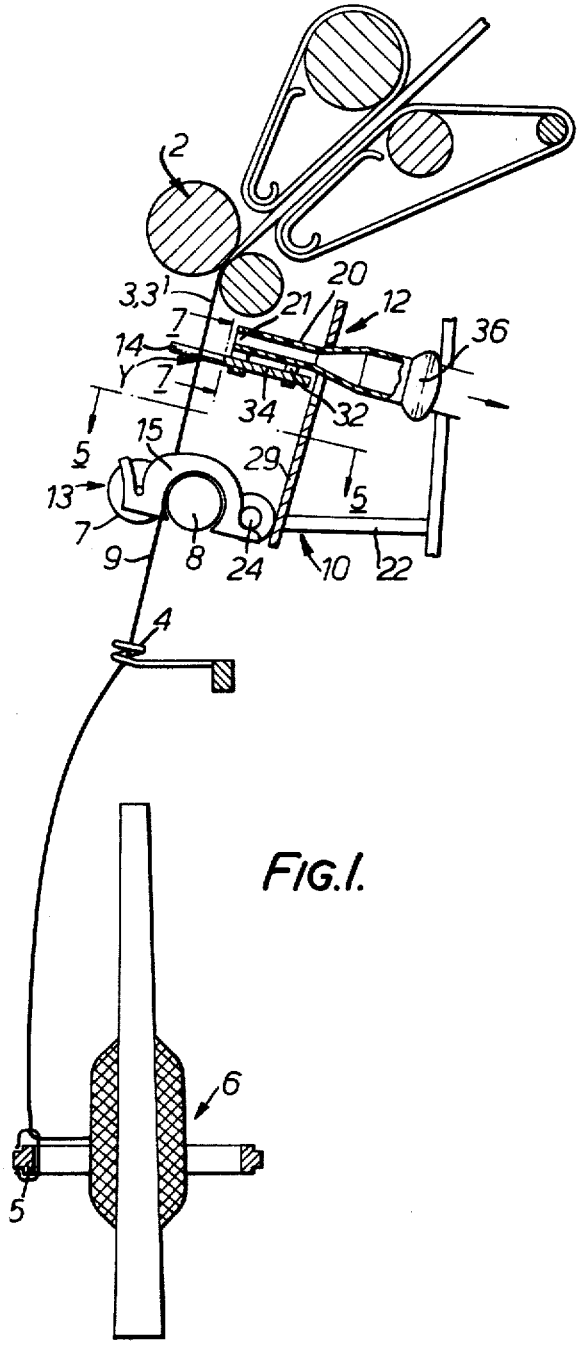
FIG. 1 is a somewhat diagrammatic partly sectioned side elevational view of a yarn production section incorporating break-out apparatus in accordance with the invention.
Figure 2:
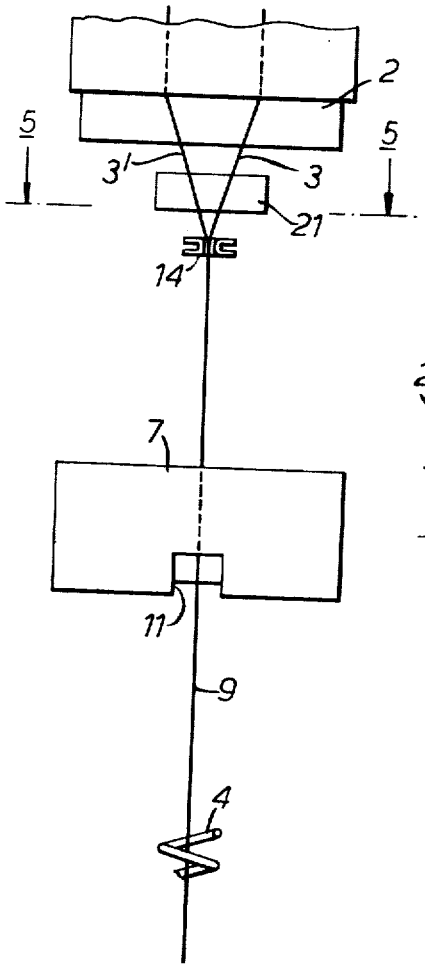
FIG. 2 is a schematic front view of the upper part of the section of FIG. 1 when in operation with the running strands intact.
Figure 3:
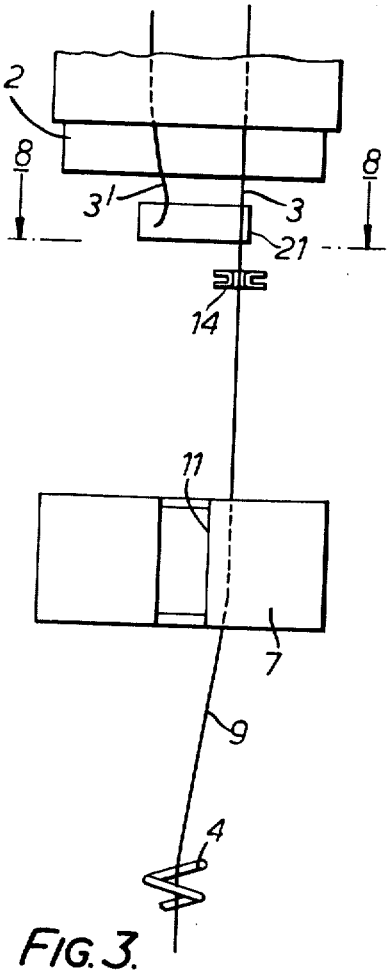
Figure 4:
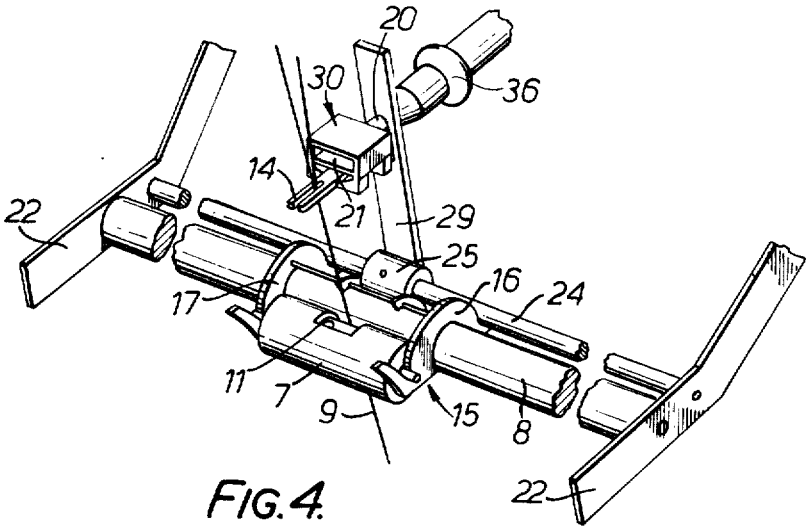
Figure 5:
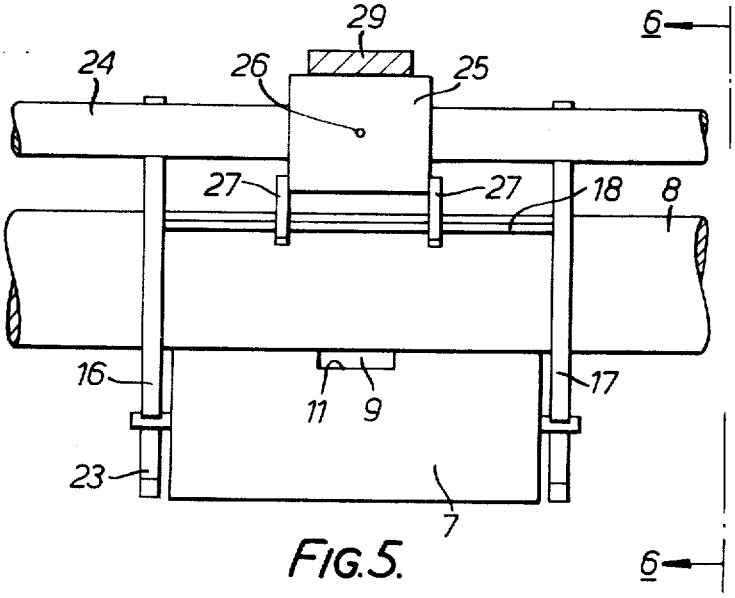
Figure 6:
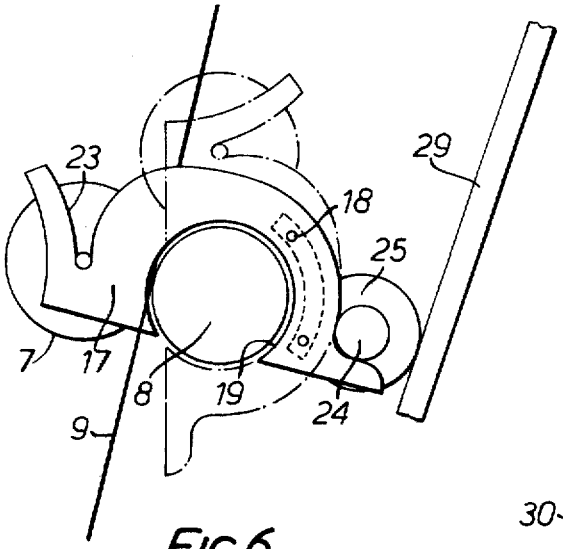
Figure 7:
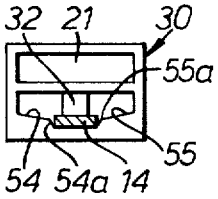
Figure 8:
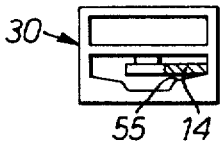
Figure 9:
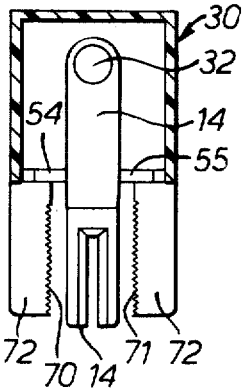
Figure 11:
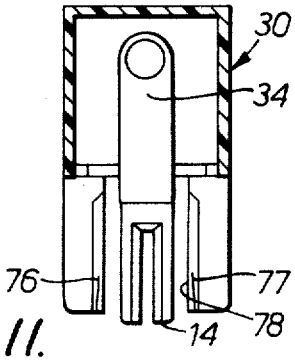
Figure 10:
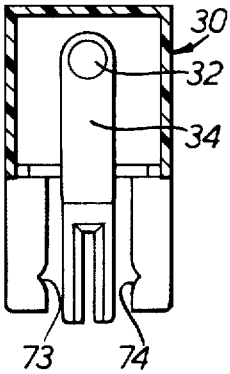

FIG. 3 corresponds to FIG. 2 but shows the condition of the section shortly after one strand has broken;

FIG. 4 is a perspective view of the break-out apparatus forming part of the yarn production section shown in FIG. 1;

FIG. 5 is a cross-sectional view on the line 5—5 of FIG. 1;

FIG. 6 is a side view on the line 6—6 of FIG. 5;

FIG. 7 is a cross-sectional view on the line 7—7 of FIG. 1;

FIG. 8 corresponds to FIG. 7, but matches the condition depicted in FIG. 3;

FIGS. 9, 10 and 11 illustrate alternative construction of the inventive apparatus.

The illustrated section is a modification of the arrangement described in the aforementioned Australian patent 473,153 and is accordingly intended for the production of a two-fold fibrous yarn of the general form depicted in FIG. 3 of that patent. The section constitutes one section of a multi-section spinning frame. It includes strand feeding means in the form of any conventional drafting rollers 2, which in use draft a pair of fibrous strands 3, 3' and feed them through pot-eye 4 to the traveller 5 of a cap or ring spinning spindle 6 which revolves to twist the strands together to form a yarn 9. A vacuum connected suction duct 20 is provided below rollers 2 to pick up loose ends in the event that one or both of the strands 3, 3' breaks. A strand guide assembly 12 incorporates the intake 21 of suction duct 20 and includes a slotted guide 14 which is positioned for converging the strands at a point Y to form yarn 9. Assembly 12 constitutes part of break-out apparatus 10 which further includes strand breaker means disposed below assembly 12 and above pot-eye 4. The strand breaker means comprises essentially a pair of rollers 7, 8 arranged to be rotated at a peripheral speed substantially equal to the delivery speed of the yarn and to provide an intermittent nip between them.

One of the rollers 8 is a plain roller whilst the other roller 7 has a semi-cylindrical relieved portion 11 (FIGS. 2 and 3) cut out from one side over part of its length. Relieved portion 11 is positioned such that as the rollers rotate the travelling combined strands will pass centrally through it at intermittent intervals, but, in accordance with a preferred feature of the present invention and as best seen in FIGS. 2 and 3, is dimensioned so that its extent longitudinally of roller 7 is somewhat less than the separation of strands 3, 3' at the drafting rollers 2.

Convergence guide 14 is located at approximately the position which would be occupied by the natural point of convergence of the strand if the rollers 7, 8 were not present and may typically be of the order of 3 cm. From the points at which the strands are nipped by front drafting rollers 2. Guide 14 is movable laterally of the general direction of travel of the strands by a sufficient sideways drag applied by the residual strand when one strand breaks.

In normal operation of the apparatus (FIG. 2), strands 3, 3' are drafted by the front drafting rollers of the drafting mechanism, and fed via the convergence guide 14, the roller pair 7, 8 and the pot-eye 4 onto the spindle 6. With the rollers 7 and 8 rotating, the nipping together of the two rollers over the unrelieved section of the roller 7 causes a twist block to be inserted between the spindle and the convergence guide 14. In this way, the passage of twist along the converged strands to the point Y is periodically blocked and the twist equilibrium at the point Y, which point remains fixed, is thereby periodically varied. As explained in specification 473,153, this periodic upsetting of the twist equilibrium at the fixed convergence point causes cyclically varying twist to be inserted into the individual strands 3, 3' and causes the resultant ply to have cyclically varying unidirectional twist.

FIG. 3 in particular illustrates the response of the break-out apparatus to breakage of one of strands, say strand 3'. The broken end of this strand is picked up as indicated at the intake 21 of suction duct 20 but the other strand 3, continues to travel to spindle 6 as a fault singles yarn. A sideways force of, for example, 7 gm wt, is immediately applied to the laterally moveable guide 14 due to the tension. This force is sufficient to release the guide to allow strand 3 to move laterally towards its then referred line of travel. Relieved portion 11 of roller 7 is of such width that the strand will thereby cross the edge of the rebate and take up approximately the position shown in FIG. 3. Strand 3 is now indefinitely nipped between rollers 7, 8 and the twist trapped between this nip and front drafting rollers 2 decays rapidly in level as the strand continues to travel to the spindle 6. In this manner, the cohesion of the strand is weakened to the point where the fibres separate and the strand breaks up, the resultant end being picked up by suction duct 20. It is found that this breakage is achieved relatively quickly to the extent that the singles section of the yarn typically will not yet have reached the spindle 6.

It will be appreciated that the axial extent of the relieved portion 11 of roller 7 must be chosen with regard to a number of considerations. It must determine a spacing sufficiently small to allow a reasonable margin for indefinite nipping to either side of the relieved portion and yet sufficiently large to provide the variations in the position of the combined strands arising both from natural short term fluctuations and from those set in on threading up of the apparatus.

FIGS. 4 to 6 illustrate the break-out apparatus 10 in greater detail. Strand breaker means 13 includes a cradle 15 consisting of a pair of spaced, matching plates 16, 17 tied together by rods such as that indicated at 18 in FIG. 5. Plates 16, 17 define central part-circular seats 19, by which the cradle is carried by roller 8 such that the roller acts as a bearing about which the cradle is rotatable between an operational additional (FIGS. 4 and 5) and a withdrawn condition (ghost lines in FIG. 6). Typically, roller 8 is common to a number of cradles forming parts of respective adjacent frame sections and is mounted for rotation in extending brackets 22 fixed integrally to the frame itself. Roller 7, on the other hand, is individual to the section and is releasably supported on the cradle by location of its axle in opposed slots 23 set into the front ends of plates 16, 17 so as to position roller 7 for friction driving engagement with roller 8. The readily effected withdrawal of roller 7 from cradle 15 is required to provide access for threading fresh ends through the section. The withdrawn condition of the cradle and roller is required during doffing to provide clear passage for the spinning bobbin.

The rear ends of plates 16, 17 engage, in the operational condition of the cradle, under a fixed non-rotatable shaft 24 also carried by brackets 22. The axes of shaft 24 and rollers 7 and 8 are arranged in a common plane substantially perpendicular to the direction of travel of the strands. The cradle is axially fixed in position on the shaft by co-operation between a sleeve 25 securable on the shaft by means such as a grub-screw 26 and arcuate sizing plates 27 carried by rods 18.

Sleeve 25 also supports a post 29 which mounts strand guide assembly adjacent its upper end. The provision of such a connection post allows proper location of the convergence guide and nipping rollers relative to each other: provision for adjustment of the spacing may be provided where desired. Strand guide assembly 12 includes a carrier 30 defining suction duct 20 and carrying a depending pin 32 (FIG. 1) which rotatably mounts an arm 34 having convergence guide 14 at its outer end. Carrier 30 extends rearwardly through an opening in connection post 29 and couples duct 20 to the adjacent frame suction tube by way of a moveable joint 36.

In order to dampen random lateral movement of the guide, with the attendant risk that the travelling converged strands will inadvertently pass out of the region of relieved portion 11 of roller 7, arm 34 seats between a pair of raised inclined lands 54, 55 (FIG. 7) on a depending portion of carrier 30, each land defining a short steeper face 54a, 55a, adjacent its inner side: this face prevents lateral movement of the guide in the absence of sufficient sideways reaction between the guide and the land. The positions of the convergence guide arm 34 during normal operation and shortly after breakage of a strand are shown respectively in FIGS. 7 and 8.

FIGS. 9 to 11 show alternative arrangements for breaking the residual strand by abrasion in place of the fibre dispersal effected by the nipping rollers in the apparatus of FIG. 1. In each of these arrangements, the laterally moveable strand guide is retained but the strand breaker means is attached to or formed integrally with carrier 30. As with the just described apparatus, the residual unbroken strand is allowed to move laterally with the movable convergence guide after the manner indicated in FIG. 3 to take up an operative position relative to the breaker means. FIG. 9 depicts the provision of abrasive facing 70, 71 on the opposed edges of side arms 72 which extend from the body of carrier 30 to embrace convergence guide 14. The abrasive edges are positioned to contact the traveling unbroken strand on its being moved laterally with guide 14 and to wear the strand. Facing 70, 71 may be simply roughened metal or may perhaps comprise a medium such as Velcron consisting of a multiplicity of minute nylon hooks. FIG. 10 illustrates the provision of shearing nips 73, 74 to receive and shear an unbroken strand. Instead of nips 73, 74 the carrier might mount respective pairs of knife edges for effecting a scissors cutting action. Finally, FIG. 11 depicts a further arrangement which utilizes opposed sharp cutting edges 78, 37 provided by blades 76, 77 set at an angle greater than 90° to the direction of travel of the strand.

All of the afore-described arrangements incorporate a laterally movable guide. It is to be emphasized that such a guide is not necessarily essential to a proper functioning of the invention. In some cases, such as in the apparatus of U.S. Pat. No. 473,153, where a vertically fixed guide must be provided, it is necessary to render that guide laterally moveable to allow for proper performance of the invention. In other cases, a guide may simply be desirable, perhaps to reduce random movement and to generally stabilize yarn travel against inadvertent contact with the strand breaker means. In still further instances, the guide may well be dispensed with, such as in a simple combining operation in which the combining strands acquire their own natural point of convergence.

Another feature of the above described arrangements which is inessential to the invention is that the strand breaker means is positioned to act on the residual strand by virtue of the strand contacting the breaker means. In an alternative apparatus, a detector may be provided for triggering a positively acting breaker in response to a detected change in the position of a strand beyond a predetermined allowable range. Here again, however, operation is dependent upon the projected change in the line of travel of the residual strand or strands when one strand breaks.

We claim:

[1. Apparatus for breaking out yarns having fewer strands than desired where two or more strands are combined into a yarn, said apparatus comprising a guide for constraining the combined strands laterally of their general direction of travel, the guide being mounted for lateral movement under pressure from a residual strand in the absence of the other to allow the residual strand to adopt a respective modified line of travel, and strand breaker means arranged to act on a strand adopting a said modified line of travel to effect breakout of that strand.]

[2. Apparatus for breaking out yarns having fewer strands than desired where two or more strands are combined into a yarn, said apparatus comprising a guide for constraining the combined strands laterally of their general direction of travel, the guide being mounted for lateral movement under pressure from a residual strand in the absence of the other to allow the residual strand to adopt a respective modified line of travel, and strand breaker means arranged to act on a strand adopting a said modified line of travel to effect breakout of that strand; said strand breaker means includes a pair of co-operating members disposed to allow free or intermittently free passage of the travelling strands within a predetermined spacing laterally of their general direction of travel, but to nip strands located at either side of this spacing.]

[3. Apparatus according to claim 2 wherein the co-operating members comprise a pair of rotatable rollers one of which has a relieved portion in its curved surface determining said spacing.]

[4. Apparatus according to claim 3 including damping means disposed to act on said guide to reduce its lateral movement with the combined strands due to random jitter or the like.]

[5. Apparatus according to claim 3 wherein the guide is mounted for said lateral movement being supported for pivotal movement in a plane transverse to the general direction of travel of the converged strands.]

[6. Apparatus according to claim 3 wherein one of said rollers is detachably supported in a cradle carried on the other roller such that the other roller acts as a bearing about which the cradle is rotatable between respective operational and withdrawn conditions.]

[7. Apparatus according to claim 1 wherein the strand breaker means comprises a pair of opposed abrasive surfaces.]

[8. Apparatus according to claim 1 including damping means disposed to act on said guide to reduce its lateral movement with the combined strands due to random jitter or the like.]

[9. Apparatus according to claim 1 wherein the guide is mounted for said lateral movement being supported for pivotal movement in a plane transverse to the general direction of travel of the converged strands.]

[10. Apparatus according to claim 1 including detector means mounted to detect lateral movement of a strand to a respective said modified line of travel, wherein said strand breaker means is connected to said detector means for energization by the detector means to effect the breakage of the residual strand upon the absence or breakage of the other.]

[11. The apparatus for forming yarns having at least two strands combined together, which apparatus includes means to feed two strands at equal rates from spaced feeding points, means to twist the travelling strands together into a single yarn, structure to break out yarns having fewer strands than desired comprising a convergence guide defining a convergence point for the strands, the guide being mounted for lateral movement under pressure from a residual strand in the absence of the other to allow the residual strand to adopt a respective modified line of travel, and strand breaker means arranged to act on a strand adopting a said modified line of travel to effect breakout of that strand.]

[12. Apparatus for forming yarns having at least two strands combined together, which apparatus includes means to feed two strands at equal rates from spaced feeding points, means to twist the travelling strands together into a single yarn, structure to break out yarns having fewer strands than desired comprising a convergence guide defining a convergence point for the strands, the guide being mounted for lateral movement under pressure from a residual strand in the absence of the other to allow the residual strand to adopt a respective modified line of travel, and strand breaker means arranged to act on a strand adopting a said modified line of travel to effect breakout of that strand; said strand breaker means includes a pair of co-operating rollers disposed to allow free or intermittently free passage of the travelling strands within a predetermined spacing laterally of their general direction of travel but to nip strands located to either siade of this sapcing, the spacing being determined by a relieved portion in the curved surface of one of the rollers.]

[13. Apparatus according to claim 12 wherein one of said rollers is detachably supported in a cradle carried on the other roller such that the other roller acts as a bearing about which the cradle is rotatable between respective operational and withdrawn conditions.]

[14. Apparatus according to claim 13 including damping means disposed to act on said guide to reduce its lateral movement with the combined strands due to random jitter or the like.]

[15. A method of breaking out yarns having fewer strands than desired where two travelling strands are fed from spaced feeding point and combined into a single yarn, comprising providing at least one strand breaker means at a fixed location spaced from the travelling strands and allowing the residual strand to adopt a respective modified line of travel when one of the strands break out, in which line of travel of residual strand operatively contacts said strand breaker means at said fixed location which then acts on the residual strand to also effect break out of that strand.]

[16. A method according to claim 15, wherein the residual strand is acted upon to effect its breakout by nipping the strand as it continues to travel.]

[17. A method according to claim 15, wherein the residual strand is acted upon to effect its breakout by wearing it away or cutting it as it continues to travel.]

[18. Apparatus for forming yarn having at least two strands combined together including feeding means for feeding two strands from spaced feeding points, twisting means to twist the travelling strands together into a single yarn, and at least one strand breaker means disposed at a fixed location spaced from the normal lines of travel of the strands during use of the apparatus, said feeding, twisting and strand breaker means being so located relative to each other that upon break out of one of said strands the residual strand is allowed to adopt a respective modified line of travel in which the residual strand operatively contacts said strand breaker means at said fixed location.]

[19. Apparatus according to claim 18 wherein said strand breaker means is comprised of a pair of cooperating rollers disposed to nip a respective one of said strands in its respective modified line of travel.]

*20. Apparatus for spinning a two-ply yarn in a single operation from two separate running strands, said apparatus having a drafting unit for drawing said strands in spaced relation to one another from separate rovings and having a rotatable spindle for twisting the drawn strands together and for winding thereon the two-ply yarn so formed, the twisting action being such as to form a distinctive convergence point between the two component strands, wherein twist blocking means are provided in the vicinity of the said convergence point so that, when one strand breaks the other is allowed to adopt a modified line of travel in which it is acted upon by said twist blocking means to substantially block the travel of twist to that portion of said other strand between said means and the drafting unit so as to thereby cause said other strand to also break.*

*21. Spinning apparatus according to claim 20 further including a suction device disposed in the vicinity of said convergence point for picking up broken strands.*

*22. Spinning apparatus according to claim 20 or 21 further including a pair of guides defining a path of travel for the two-ply yarn, wherein one of the guides, mounted for lateral movement under pressure from an unbroken strand to adopt its respective said modified line of travel, strad to adopt its respective said modified line of travel.*

*23. Spinning apparatus according to claim 22 further including centering means disposed to act on said guide to reduce its lateral movement with the combined strands due to random jitter or the like.*

*24. Spinning apparatus according to claim 20 wherein said twist blocking means comprises a pair of cooperating rollers disposed to nip the strands in their respective modified lines of travel to thereby substantially block the travel of twist along the nipped strand.*

*25. Spinning apparatus according to claim 24 wherein one of the rollers includes a relieved portion in its curved surface, shaped for allowing intermittent free passage of the travelling combined strands while nipping either strand in the event that it adopts its respective said modified line of travel.*

*26. A method of spinning a two-ply yarn in a single operation from two separate running strands, comprising drawing said strands in spaced relation to one another from separate rovings and twisting the drawn strands together to form a two-ply yarn, the twisting action being such as to form a distinctive convergence point between the two component strands, wherein one strand breaks the other is allowed to adopt a modified line of travel in which the travel of twist along the strand is substantially blocked so as to thereby cause said other strand to also break.*

*27. A method according to claim 26 wherein broken strands are picked up by a suction device disposed in the vicinity of said convergence point.*

*28. A method according to claim 26 or 27 wherein the strands are passed through a guide mounted for lateral movement under pressure from an unbroken strand in the absence of the other to allow the unbroken strand to adopt its repsective said modified line of travel.*

*29. A method according to claim 26 or 27 wherein said travel of twist is blocked by nipping the unbroken strand in its modified line of travel.*

* * * * *

UNITED STATES PATENT AND TRADEMARK OFFICE

CERTIFICATE OF CORRECTION

PATENT NO. : Re. 30776

DATED : October 20, 1981

INVENTOR(S) : Dieter E.A. Plate and John D. Feehan

It is certified that error appears in the above—identified patent and that said Letters Patent is hereby corrected as shown below:

Column 8, line 21, delete "," after "guides" and insert therefor --is--;

Column 8, line 46, after "wherein" insert --when--.

Signed and Sealed this

*Twelfth* Day of *January 1982*

[SEAL]

*Attest:*

GERALD J. MOSSINGHOFF

*Attesting Officer*

*Commissioner of Patents and Trademarks*